United States Patent [19]
Bosco

[11] 3,808,032
[45] Apr. 30, 1974

[54] PENETRATING TREATMENT FOR WOOD PLASTIC COMPOSITES AND TREATED COMPOSITES

[75] Inventor: Lewis R. Bosco, Karthaus, Pa.

[73] Assignee: Atlantic Richfield Company, New York, N.Y.

[22] Filed: Dec. 13, 1971

[21] Appl. No.: 207,115

[52] U.S. Cl.............. 117/72, 117/87, 117/93.31, 117/148, 117/150, 117/161 UZ, 117/167
[51] Int. Cl......... B44d 1/50, C08f 3/30, C08f 3/62
[58] Field of Search ............. 117/93.31, 72, 87, 66, 117/148, 150, 167, 161 UZ

[56] References Cited
UNITED STATES PATENTS

| | | | |
|---|---|---|---|
| 3,597,262 | 8/1971 | Bader et al. | 117/93.31 |
| 3,180,753 | 4/1965 | Fritsch et al. | 117/72 |
| 3,190,767 | 6/1965 | Tomany et al. | 117/72 |
| 3,326,710 | 6/1967 | Brodie | 117/72 |
| 3,579,410 | 5/1971 | Barrett | 117/148 |

Primary Examiner—William D. Martin
Assistant Examiner—John H. Newsome
Attorney, Agent, or Firm—John C. Martin, Jr.

[57] ABSTRACT

Process for imparting long lasting gloss, and color depth properties to wood plastic composites comprising sanding, applying a small amount of a drying or semi-drying oil to the surface, and buffing. Also, wood plastic composites having improved properties.

13 Claims, 2 Drawing Figures

PATENTED APR 30 1974 3,808,032

INVENTOR
LOUIS R. BOSCO

Michael B. Frein
ATTORNEY 3,808,032

PENETRATING TREATMENT FOR WOOD PLASTIC COMPOSITES AND TREATED COMPOSITES

BACKGROUND OF THE INVENTION

1. Field of the Invention

This invention relates to a treatment for wood-plastic composites and new wood plastic composites.

2. Description of the Prior Art

Wood-plastic composites have been prepared and have a wide variety of utilities and applications in which they perform notably better than un-impregnated woods. Feibush et al., U.S. Pat. No. 3,407,088, Oct. 22, 1968, show increased tensile strength by irradiation polymerized vinyl chloride-impregnated wood composites. Flooring and decorative panels have been the prime utilities of these composites.

Although the composites are initially more expensive than untreated wood articles, they have the advantage of not requiring waxing or stripping to retain their good appearance. This, in part, is due to the fact that the composites are not coated with a superficial coating such as Polyurethane. A satin smooth surface is easily obtained by sanding as is taught by Feibush et al., supra. This surface is intentionally a non-continuous one, that is the surface consists of both wood and polymer, as distinguished from a surface coated with a continuous coating of polymer.

Even though these wood-plastic composites have exceptionally good appearance, it is difficult to simulate the high gloss appearance of a newly waxed wood. To wax the wood-plastic composites would result in loss of their non-maintenance advantages.

Another difficulty has been the prevention of water spotting and water, oil, and grease staining without resorting to waxing.

SUMMARY OF THE INVENTION

It is therefore an object of the invention to provide a long lasting treatment for wood-plastic composites.

It is another object to provide a treatment for wood-plastic composites which prevents water, oil, and grease staining and spotting.

It is a further object to provide a wood-plastic article having permanent gloss, water spotting resistance, and stain resistance.

A still further object of the invention is to provide a wood plastic composite having individual surface wood fibers coated with a composition so as to impart permanent high gloss, water spotting resistance, and stain resistance to the surface of the composite.

These, and other objects as will become apparent, are accomplsihed by the process of this invention which comprises applying a small amount of a penetrating solution of a drying or semi-drying oil to the surface of a sanded wood-plastic composite, and thereafter buffing. In another aspect, the invention comprises novel wood-plastic articles having permanent gloss, water spotting resistance, and stain resistance.

Figure 1:
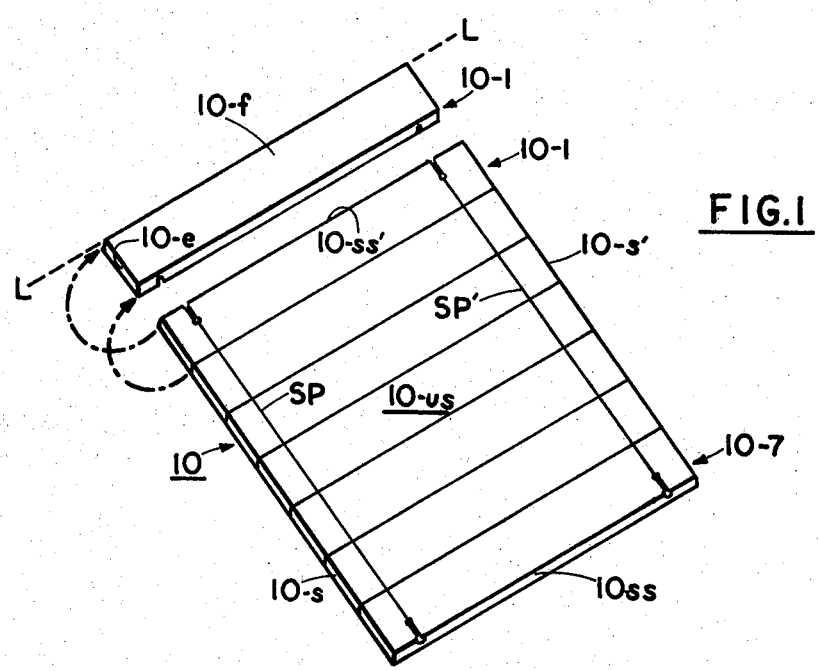
FIG. 1 is a schematic bottom perspective view of a plurality of wood-plastic pieces assembled into the form of a single unitary floor tile, and adapted to be treated to fabricate a WPC product according to the invention, one of the pieces being exploded away and turned over.

DETAILED DESCRIPTION OF THE DRAWINGS AND DESCRIPTION OF THE PREFERRED EMBODIMENTS

The wood-plastic composites to be treated in accordance with this invention are wood articles which have been impregnated with an organic monomer and thereafter subjected to irradiation so as to polymerize said organic monomers in situ. Suitable wood previously used for flooring or decorative applications and includes, among others, red oak, white oak, spruce, yellow poplar, sugar maple, white pine, birch, mahogany, and locust. The organic monomer is any which is subject to free radical polymerization. Suitable monomers include methyl methacrylate, vinyl chloride, acrylonitrile, vinyl acetate-vinyl chloride mixtures, styrene and other olefinically unsaturated compounds. From about 1 to about 200 percent by weight based on the weight of wood or organic monomer is introduced as a liquid to impregnate the wood. Usually the polymer will be evenly distributed throughout the wood structure; however, in some species, the heartwood and sap wood differ in "monomer uptake" (e.g. in walnut, beech, red pine and cherry). "Open Structure" woods such as maple and birch appear to have no such "uptake differential" characteristics, although these woods are more expensive. Resinous and "hard-to-penetrate" heartwoods, including oak and many varieties of pine, present other difficulties. For instance, the openings between the cells of white oak appear too small to allow an efficient, effective penetration of the monomer. Lower grade woods are generally soft and contain greater quantities of sap, tannin and gum which can cause non-uniform impregnation, poor appearance and exhibit less structural strength. More importantly, soft woods typically absorb on the order of 1.1 pound of monomer per pound of wood, compared with about 0.7 pounds absorbed by hard- woods.

The form into which the wood is placed for the WPC (impregnation and irradiation) treatment will depend to an extent upon economics and, for instance, may comprise a solid block of wood, or a stacked array of fillets or an assembly of fillets, formed into one or several integral "tiles" by various means discussed below. In any case, the raw wood will typically take form of boards, which should be inspected, and defects (such as knots, etc.) cut out in a trimming saw operation. Such a trimming may typically yield about 122 usable sq. ft. from 1,000 board feet. The trimmed boards may then be cut into blocks suitable for fitting into the treatment containers, the blocks first being fed to a planer to be rough-finished. Such blocks may then be placed in the impregnant container as discussed below to be impregnated and thereafter irradiated.

However, it may often be preferable to first subdivide these blocks into small smooth finger boards (fillets), for instance, about 6 inches by ⅞ inch by 5/16 inch. This may be performed by planing the blocks to a thickness determining the width of the fillet and then cutting out the fillet lengths and widths with a gang saw. The fillets are then suitable for stacking in containers for impregnation and irradiation, as indicated below.

However, according to an improvement feature of this teaching, we have found it preferable in these cases to assemble a number of these fillets into a unitary tile and treat (e.g. impregnate, irradiate, finish, etc.) the tile rather than the fillet. An example is tile 10 in FIG. 1 comprising seven jointed fillets, 10–1 through 10–7. Various means may be used for fastening the fillets together, such as edge-bonding (glueing), adhering them to a common backing (discussed below), or mechanical fastener means. A particularly suitable form is illustrated in the form of a pair of spline wires joining the fillets to form tile 10. Glue-bonding will be strongest where fillet pores are the least filled (see below, and also Report by University of W. Virginia to Atomic Energy Commission, DID: "ORO–2945–5"; July 1966, for details).

Workers in the art will recognize that various handling apparatus may be used to automatically assemble and align the prescribed number of fillets to form such a tile. Such apparatus may also perform related operations like edge finishing (e.g. tongue and groove forming, etc.), trimming the panel to obtain precise dimensions, forming bevels on the underside edges to provide mastic-accepting grooves, and the like. The apparatus for assembling and joining fillets should also provide for a specified controlled adjustable clearance between fillets, such as the (8 mil) clearance between fillets of the tile indicated in FIG. 1. This will accomodate the swelling to be expected in use and accomodate treatment and bonding operations. Fastening may be then performed, where applicable, such as by embedding splined wires $sp, sp'$ across the fillets spanning the width of tile 10, preferably cutting off their ends and locking them inset in place as indicated in FIG. 1 in a punching operation. Of course, one may use any number of such wires; however, it has been found that a pair fastened in the indicated manner are suitable for forming a 6 inch by 6 inch floor tile, something understood by workers in the flooring art as a convenient dimensional module. Thus, tile 10 may be understood as viewed from its underside (fastening side) and as having a pair of width edges 10–s, 10–s', these edges preferably being 6 inches long and cut square and smooth (e.g. for butt-joining with other tiles for laying a parquet floor). Alternatively, the edges may comprise various interlocking configurations known in the flooring art, such as "tongues and grooves". Tile fillet 10–1 in FIG. 1 is shown exploded away from tile 10, and turned over, with its elongated axis L—L, also the grain direction (fibre alignment). Each fillet may be understood as having a smooth-finished face 10–$f$ (the working surface).

Figure 2:
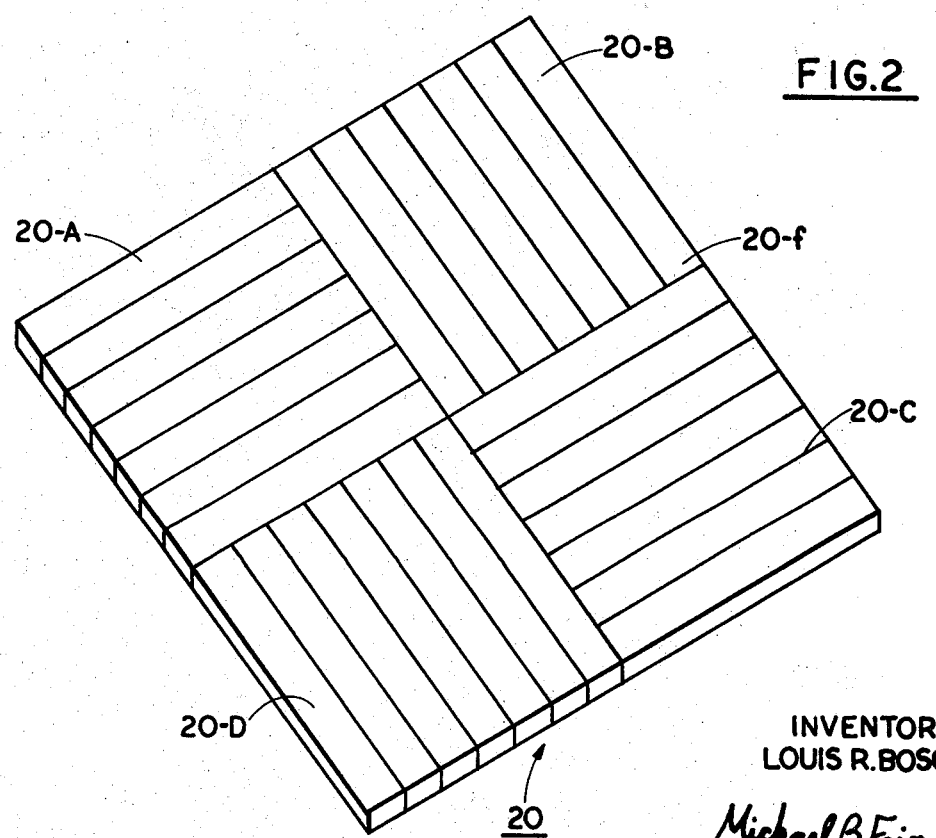
FIG. 2 is an upper perspective view of four tiles of the type indicated in FIG. 1 assembled together on a common backing to comprise a single unitary panel.

In some cases, it will be preferable to assemble a number of such tiles to form a single integral "panel" and treat the panel. Thus, a plurality of such tiles are shown fastened together into a single unitary panel 20 in FIG. 2, comprising tiles 20–A, 20–B, 20–C, and 20–D, each tile being substantially like tile 10 in FIG. 1, except for the fastening means, as indicated below. Of course, any number of suitable tiles may be joined to comprise such a panel. The panel will be especially applicable for conventional flooring applications, as with analogous panels of wood, plastic, elastomers, or the like. For instance, joining four 6 inch by 6 inch tiles into the panel indicated will yield a 12 inch by 12 inch panel conforming to a dimensional module useful in the flooring art. Composite panel 20 is thus comprised of four sets of seven adjacent fillets, the sets arranged in orthogonal adjacency to present a common coplanar finish face 20-f on one side and to be bonded together by suitable fastening means.

The mechanical fillet-fastening of FIG. 1 is preferred for certain applications, especially since, unlike many backings, and associated adhesive materials, mechanical fasteners, like spline wires $sp, sp'$, will not adversely interact with impregnating-irradiation materials during, or after, treatment. Further, these wires are adapted to incorporate a certain degree of flexibility into the tile, allowing it to be smoothly bent, to an extent, along the "spline direction" (direction of fillet width) and thereby accommodating a certain amount of normal fillet expansion, subfloor-unevenness, etc., without buckling or protruding upward unduly. "Tongue and groove" interfitting of tiles, as laid, also allows for subfloor anomalies. The present spacing between fillets will also accommodate some normal swelling and should thus be carefully controlled. To best allow for swelling or other expansion, it will be understood as preferable to lay such tiles "cross-wise" where possible; i.e. with ends facing sides, as illustrated on the panel in FIG. 2, not "end-to-end", or "side-to-side". This, of course, best distributes any expansion in both directions across a floor area. Other analogous mechanical fastening techniques will be contemplated such as stapling, end-splining, edge-fastening and the like.

The monomer-impregnated wood is thereafter subjected to a suitable radiation source, such as high energy particulate radiation, or high energy electromagnetic radiation for a time sufficient to polymerize the organic monomer in situ. Cobalt 60 is the preferred irradiation source.

Alternatively a heat activated catalytic polymerization system can be substituted for the irradiation polymerization system. Exemplary catalysts include the azo type, for example 2,2'-azobis (isobutyronitrile) incorporated in the monomer in amounts ranging from 0.01 to 0.5 per cent by weight, preferably 0.1 to 0.4 weight per cent, but the exact amount depends on the cure times and temperatures selected. Cure conditions optimumly include heating the monomer impregnated substrate at a temperature of from about 60° to about 80°C. until the polymerization exothermic period is complete, and then curing at about 80° to about 100°C. or more after purging composite with nitrogen.

The radio-induced polymerization of the above described treatment will be understood as causing the monomer molecules to become linked throughout the wood, forming a network of polymer that envelopes wood cells, encasing them tightly within a seal of plastic. Radiation-induced-polymerization, like conventional polymerization, proceeds by a free radical process, but does not require the addition of either heat or catalyst. Absorption of radiation energy by the monomer molecules results in the production of free radicals. These free radicals attach to a double bond of a monomer molecule, thereby generating another free radical. This process proceeds until the growing polymer chain is terminated or the radiation is removed. Because radiation in effect acts as catalyst, it offers a method of controlling the exothermic polymerization reaction within the wood substrate, a control which would be difficult to achieve with conventional polymerization techniques employing catalysts and heat.

It will be understood that such radio-induced polymerization affords a number of advantages over Thermal-catalytic Techniques, such as: extending monomer pot life, avoiding the inhibitory inter-action of some wood resins with catalysts; avoiding the long curing times and elevated temperature typically associated with conventional polymerization; and dangers of uncontrolled polymerization and of catalyst residue.

A coloring agent is preferably incorporated with the organic monomer, as desired. The resulting wood-plastic composite is then sanded so as to obtain a smooth surface.

In one embodiment, impregnated, irradiated wood should be surface-finished to remove impregnant-depleted surface layers, as well as to establish a flat, smooth finish at the desired fillet thickness. For red oak fillets, treated as aforedescribed and assembled into panels (as in FIG. 2) thereafter, this will sometimes involve cutting away about 20–30 mils or more, when surface deviations require; however, this treatment, fortunately, penetrates so deeply that deep-cutting does not harm.

It has been found very important to sand with (not against, or across) the fillet grain if possible. This was surprising since it, at first, appeared desirable to sand against the grain; for instance, so as to minimize "polymer liftout". However, this was found to leave scratches that were extremely noticeable and virtually impossible to buff away or disguise. However, such scratches are not apparent when sanding with the grain. Of course, this is not practically possible with an embodiment like that of FIG. 2. It will also be important to renew sander belts before they are degraded (e.g. by "polymer build-up") to the point where they can scratch or mar the wood finish.

Close analysis of this surface shows that there are microscopic wood fibers which lay down on or become oriented along the surface of the composite when buffed, resulting in a high gloss finish. However, upon passage of time, and especially when contacted with water, these microscopic fibers rise up and cause a loss of gloss properties.

In accordance with the invention, the wood-plastic composite is treated with a small, controlled amount of a drying or semi-drying oil. The result of this treatment is to coat the individual fibers and cause them to remain down on the surface of the composite, thereby preserving and enhancing the finish. The drying or semi-drying oil becomes absorbed in the fibers, and undergoes a combination of oxidation and condensation reactions which result in a mixture of high molecular weight compounds.

Suitable drying and semi-drying oils include soybean, linseed, tall, tung, perilla, oiticica, cottonseed, corn, sunflower, dehydrated castor oil and the like. The preferred drying oil is doubly boiled linseed oil.

While it is greatly preferred to apply the process of the invention to a continuous process at the point of manufacture of the wood composites, it can also be applied very successfully to wood-plastic composite floors which have already been installed. The preferred processes are somewhat different when performed "in field" and at point of manufacture of the composites. When "in field," it is preferred to apply the drying oil or semi-drying oil to the wood-plastic composite in a solvent carrier. Suitable solvent carriers include low boiling petroleum distillates, low boiling petroleum distillates such as mineral spirits, naphtha (VM&P type), Stoddard solvent, petroleum ether and the like. The volume ratio of drying oil to solvent carrier is suitably from about 3:1 to 1:3 and preferably from about 1.5:1 to 1:1.5. The preferred solvent carrier is Stoddard solvent. After application, the solvent carrier vaporizes, leaving the drying oil or semi-drying oil as a coating on the wood fibers, but does not form a continuous film over the entire surface of the composite.

Any suitable means for applying the required amount of formulation can be used.

In the "in field" case, a sponge mop is one very suitable means, especially when the process is being applied to flooring composites already in place. The amount of drying oil and solvent carrier formulation applied is between one gallon per 1,000 square feet and one gallon per 2,500 square feet, preferably one gallon to between 1,300 and 2,000 square feet.

In the "point of manufacture" case, the drying oil is supplied to the surface of the wood-plastic composite in amounts sufficient to coat the individual surface wood fibers, but insufficient to coat the entire surface, preferably from about 0.5 to about 2.0, more preferably from about 0.9 to about 1.1 gallons of drying or semi-drying oil per 6,000 square feet of wood composite surface. Preferably, the drying or semi-drying oil is applied in a continuous process at speeds and conditions designed to insure application of the desired amount of formulation per square foot. One suitable means of continuous application is a rubber type print roll having a pattern embossed thereon to "print" the formulation in a pattern as the wood composite is passed under the roller. The pressure on the roller preferably can be adjusted to help control the application of the desired amount of formulation.

Optionally, a siccative agent is incorporated in the formulation to accelerate the polymerization of the drying or semi-drying oil after it is applied to the wood-plastic composite surface. Suitable siccative agents include heavy metal salts, such as naphthenates or neodecanates of cobalt, lead, manganese, or zinc and other drying accelerators. Mixtures of salts are especially suitable and are preferred. Preferred amounts of siccative agent are from about 0.01 to 1 weight per cent based on the weight of the formulation, and more preferably from about 0.05 to 0.5 weight per cent.

While not intending to be bound by any theory of the invention, it is thought that the drying or semi-drying oil becomes absorbed in the wood fibers on the surface of the composite and polymerizes to form a water-resistant finish. Without the drying or semi-drying oil treatment, water coming in contact with the composite surface has a tendency to swell the fibers which had been pressed into the surface by the sanding and buffing operations and causes the fibers to spring up, adversely affecting the appearance, gloss, and beauty of the composite. The drying or semi-drying oil treatment permanently prevents the wood fibers from moving to any great extent causing water spots and water staining.

After application of the formulation in accordance with the process of the invention, it is preferred to again buff the surface to remove any excess material. One suitable means for this buffing is use of a nylon pad. To obtain the most aesthetically pleasing properties, it is preferred to buff one more time with a nylon pad to polish the floor after about 24 hours from application of the formulation.

Optionally, heat and pressure are applied during the buffing and have been noted to have a beneficial effect.

Optionally, before the formulation of the invention is applied to a wood composite which has been in use in a flooring or other application, the surface of the composite can be sanded and then pre-wetted by uniformly applying a small portion of water in order to cause the surface wood fibers to stand up and to swell, and to better absorb the drying oil or semi-drying oil formulation when applied.

The following examples are given to more fully illustrate the invention, but are not intended to be limiting upon the scope thereof.

EXAMPLE I

Splints of red oak ¾ inch × ¼ inch × 6 inches long were impregnated with methyl methacrylate and irradiated to polymerize the methyl methacrylate under high energy electromagnetic radiation with a cobalt-60 source at a dose rate of 32,000 rads per hour. The exposure required to obtain polymerization was 1.7 megarads. The resulting wood-plastic composite was 75 per cent by weight wood and 30 per cent by weight plastic, with the surface being approximately 50 per cent by weight wood. The resulting splints were assembled into panels, 7 lengths per panel, and thereafter sanded to a relatively smooth surface. The sanded composites were continuously contacted with a rubber-type print roller having an embossed diamond pattern to which was continuously supplied doubly boiled linseed oil so as to leave a regular pattern of diamond shaped linseed oil deposited on the surface of the composites at a rate and pressure sufficient to apply one gallon per 6,000 square feet of composite surface area. The composite surface was continuously buffed after passing under the roller applicator, and again buffed after 24 hours. The linseed oil contained 0.2 percent by weight of a siccative agent consisting of a mixture of lead, cobalt, and zinc neodecanates. The resulting composites exhibit a relatively high gloss and are not noticeably stained or spotted by water. When used in a flooring application, the treated composites retained their high gloss and beauty for much longer periods than the untreated composites and did not show wear patterns as did the untreated panels.

EXAMPLE II

An untreated installation of red oak-methyl methacrylate composite floor parquets prepared as according to the last example, but are not treated with linseed oil, were subjected to a year of normal flooring wear, after which time the panels had lost their original color depth.

The panels were sanded, wet mopped to raise the wood fibers, buffed, and then treated with a doubly boiled linseed oil-Stoddard solvent mixture (1:1 by volume) applied with a sponge mop at rate of one gallon to 1,600 square feet of surface area, and then buffed with a 3M Line 51 buffer pad, and buffed again after 24 hours.

The resulting surface had a relatively high gloss and good color intensity which did not fade upon continued use of the surface of flooring.

EXAMPLE III

Splints of red oak were impregnated with methyl methacrylate containing 0.2 percent by weight 2,2'-azobis (isobutyronitrile) in a conventional full cell apparatus to the extent that the impregnated wood contains 60 percent of its theoretical maximum, with moisture content maintained below 10 percent to minimize sample distortion during curing which is effected in closed containers in a bath or oven at about 70°C. for 2 hours and thereafter the excess monomer is cured after purging with nitrogen by raising the temperature to 90°C. for 30 minutes.

EXAMPLE IV

An archery bowstock was prepared as follows: An untreated maple bow was impregnated with methyl methacrylate, subjected to irradiation to polymerize in situ as in the preceeding examples, wiped with a 1:1 double boiled linseed oil-Stoddard solvent mixture, allowed to dry 16 hours, and buffed to a very beautiful finish. The resultant archery bow had superior mechanical properties such as flex strength and resiliency.

EXAMPLE V

In a like manner a walnut bow was treated and also resulted in a bow with superior mechanical properties and beauty.

Workers in the wood products arts will visualize many applications for wood surfaces treated in the foregoing manner, whether or not the pieces are treated in fillet or tile form. For example, they may be employed for specialty flooring and other building components (e.g. doors, window sashes, handrails); or for furniture parts (e.g. desk tops, chair seats); or for industrial components (e.g. textile bobbins, patterns and jigs); or for sporting goods (e.g. gun stocks, golf clubs, bowling pins, boats); or for toys and school supplies; or for specialty items such as tools, handles (cutlery), wooden ware, and the like. Wood so treated will in general be harder, denser and more durable than ordinary wood, depending on the per cent polymer loading; and will compare very favorably as to the properties of: static bending, sheer, flame retarding, (apparent) dimensional stability, decay resistance, compressive strength, weatherability, "machineability", and aesthetic appearance.

It is to be understood that changes and variations may be made without departing from the spirit and scope of the invention.

I claim:

1. A process for producing stain resistant wood-plastic composites comprising impregnating wood with an organic free radical polymerizable monomer, polymerizing the resultant monomer-impregnated wood in situ and thereafter coating the surface of the resultant polymer-impregnated wood composite with a penetrating solution comprising a drying oil or semi-drying oil.

2. The process of claim 1 wherein said monomer is polymerized in situ by means of ionizing radiation.

3. The process of claim 1 wherein said monomer contains from about 0.01 to about 0.5 weight per cent of a free radical polymerization catalyst and is polymerized in situ by subjecting the monomer impregnated wood to heat to initiate polymerization.

4. The process of claim 1 wherein said organic free radical polymerizable monomer is selected from the group consisting of methyl methacrylate, vinyl chloride, acrylonitrile, vinyl acetate, styrene, and mixtures thereof.

5. The process of claim 1 wherein said drying oil or semi-drying oil is selected from the group consisting of soybean, linseed, tall, tung, perilla, oitica, cottonseed, corn, sunflower, and dehydrated castor oil and mixtures thereof.

6. The process of claim 1 wherein the drying oil is doubly boiled linseed oil.

7. The process of claim 1 wherein said composition is applied to said composite in a volumetric amount of from about 0.5 to about 2.0 gallons per 6,000 square feet of composite surface.

8. The process of claim 1 wherein said penetrating solution further comprises an organic hydrocarbon solvent, and the volume ratio of oil to solvent is from about 3:1 to 1:3.

9. The process of claim 8 wherein the solvent is selected from the group consisting of naphtha, Stoddard solvent, and petroleum ether.

10. The process of claim 1 wherein said penetrating solution further comprises from about 0.01 to about 1 weight per cent of a siccative agent.

11. The process of claim 10 wherein said siccative agent is selected from the group consisting of cobalt, lead, zinc, and manganese salts and mixtures thereof.

12. The process of claim 10 wherein said monomer is methyl methacrylate, said drying oil is doubly boiled linseed oil which is applied to said wood composite in a continuous manufacturing process in a volumetric amount of from about 0.5 to about 2.0 gallons per 6,000 square feet of composite surface, and the composite is thereafter buffed.

13. A wood plastic article having a surface having permanent gloss, water spotting resistance, and stain resistance wherein said article is prepared by impregnating wood with an organic free radical polymerizable monomer, polymerizing the resultant monomer-impregnated wood in situ and thereafter coating the surface of the resultant polymer-impregnated wood composite with a penetrating solution comprising a drying oil or semi-drying oil.

* * * * *